US008635456B2

(12) United States Patent
Fascenda (10) Patent No.: US 8,635,456 B2
(45) Date of Patent: *Jan. 21, 2014

(54) REMOTE SECURE AUTHORIZATION (75) Inventor: Anthony C. Fascenda, Bethesda, MD (US)

(73) Assignee: Koolspan, Inc., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/890,023

(22) Filed: Sep. 24, 2010

(65) Prior Publication Data

US 2011/0016323 A1    Jan. 20, 2011

Related U.S. Application Data

(63) Continuation of application No. 11/001,084, filed on Dec. 2, 2004, now Pat. No. 7,827,409, and a continuation-in-part of application No. 10/679,371, filed on Oct. 7, 2003, now Pat. No. 7,325,134.

(60) Provisional application No. 60/526,095, filed on Dec. 2, 2003.

(51) Int. Cl.
*H04L 9/32* (2006.01)

(52) U.S. Cl.
USPC .......................................... 713/171; 713/165

(58) Field of Classification Search
USPC ................................................ 713/165, 171
See application file for complete search history.

(56) References Cited

U.S. PATENT DOCUMENTS

| 7,178,025 | B2 * | 2/2007 | Scheidt et al. | 713/168 |
| 7,203,844 | B1 * | 4/2007 | Oxford | 713/193 |
| 7,234,057 | B2 * | 6/2007 | Park | 713/155 |
| 7,370,350 | B1 * | 5/2008 | Salowey | 726/7 |
| 2002/0090089 | A1 * | 7/2002 | Branigan et al. | 380/270 |

* cited by examiner

*Primary Examiner* — Amare F Tabor
(74) *Attorney, Agent, or Firm* — Hunton & Williams LLP (57) ABSTRACT

The present invention discloses a technique provisioning network cryptographic keys to a client when direct physical transfer is not feasible. In an embodiment of the invention, a client token generates a temporary key encrypted with a first secret key known only in a master token database and passes this on to an enterprise network token of a network to which service is requested. The enterprise network token then further encrypts the encrypted temporary key with a second secret key and passes that on to the master token database. Since the second secret key is also known by the master token database, the originally encrypted temporary key can be securely decoded only by a master token coupled to the master token database. The decrypted temporary key can then be re-encrypted with a key known only by the enterprise network token and the master token, and returned to the enterprise network token. This allows the enterprise network token to gain secure access to the temporary key of the client token, thereby allowing the enterprise network token to securely provision the remote client token with the appropriate enterprise Network Keys.

2 Claims, 9 Drawing Sheets

REMOTE SECURE AUTHORIZATION

CROSS-REFERENCE TO RELATED APPLICATIONS

This instant application is a continuation of pending application Ser. No. 11/001,084, filed on Dec. 2, 2004, the disclosure of which is incorporated herein by reference in its entirety, which claims priority to U.S. Provisional Application No. 60/526,095 filed on Dec. 2, 2003, the disclosure of which is incorporated herein by reference in its entirety, and is a continuation-in-part application of U.S. patent application Ser. No. 10/679,371, entitled "Localized Network Authentication and Security Using Tamper-Resistant Keys," filed Oct. 7, 2003, the disclosure of which is incorporated herein by reference in its entirety. The instant application is also related to copending U.S. patent application Ser. No. 10/679,268, entitled "Shared Network Access Using Different Access Keys," filed Oct. 7, 2003, and copending U.S. patent application Ser. No. 10/679,472, entitled "Self-Managed Network Access Using Localized Access Management," filed Oct. 7, 2003, the disclosures of which are both incorporated by reference in their entirety.

BACKGROUND OF THE INVENTION

1. Field of the Invention

The present invention relates to wireless networking, and more particularly, to a technique for remote, secure and authorization of and provisioning of network cryptographic keys to a client of an wireless enterprise network.

2. Description of Related Art

A Wireless Local Area Network (WLAN) is generally implemented to provide local connectivity between a wired network and a mobile computing device. In a typical wireless network, all of the computing devices within the network broadcast their information to one another using radio frequency (RF) communications. WLANs are based on the Institute of Electrical and Electronic Engineers (IEEE) 802.11 standard, which designates a wireless-Ethernet specification using a variety of modulation techniques at frequencies generally in the 2.4 gigahertz (GHz) and 5 GHz license-free frequency bands.

The IEEE 802.11 standard ("Wi-Fi"), the disclosure of which is incorporated herein in its entirety by reference, enables wireless communications with throughput rates up to 54 Mbps. Wi-Fi (for "wireless fidelity") is essentially a seal of approval certifying that a manufacturer's product is compliant with IEEE 802.11. For example, equipment carrying the "Wi-Fi" logo is certified to be interoperable with other Wi-Fi certified equipment. There are Wi-Fi compatible PC cards that operate in peer-to-peer mode, but Wi-Fi usually incorporates at least one access point, or edge device. Most access points have an integrated Ethernet controller to connect to an existing wired-Ethernet network. A Wi-Fi wireless transceiver connects users via the access point to the rest of the LAN. The majority of Wi-Fi wireless transceivers available are in Personal Computer Memory Card International Association (PCMCIA) card form, particularly for laptop, palmtop, and other portable computers, however Wi-Fi transceivers can be implemented through an Industry Standard Architecture (ISA) slot or Peripheral Component Interconnect (PCI) slot in a desktop computer, a Universal Serial Bus (USB), or can be fully integrated within a handheld device.

Authentication and security features offered by Wi-Fi products to date have been implemented via Wired Equivalency Protocol (WEP). With WEP enabled, an access point will not admit anyone onto the LAN without the proper WEP settings. The WEP settings are used primarily for wireless security, but they also form the basis for authentication in that without these settings known to and used by the user, the user cannot connect through the access point. WEP comes in 40-bit or 128-bit forms. The 40-bit version is actually a 40-bit key plus a 24 bit Initialization Vector ("IV"), whereas the 128-bit version is really a 104-bit plus the 24-bit IV. WEP utilizes a RC4 stream cipher. This stream cipher works by using the WEP key and the IV to seed a pseudo-random number generator ("PRNG"), which generates a keystream equal in length to the text it is encrypting plus the W. The text and keystream are XOR'd together to produce the encrypted data. Prepended to the encrypted data is the IV so that the receiving side can seed its PRNG to XOR the encrypted text with the same keystream to recover the original text.

Unfortunately, the mere presence of the plain text IV prepended to the encrypted text enables one to easily attack WEP. In a WEP attack, since the IV is known, i.e., transmitted as plain text, and the first byte of the encrypted text is known, the first byte of the keystream can be immediately derived. Since a standard WEP key has a first byte that is constrained to values between three (3) and seven (7), and the second byte must be 0xFF, all that is necessary is a large sample of data to quickly, e.g., less than 15 minutes, recover the original key. Since the IV is only 24-bits, there can only be approximately 17 million distinct values. In a typical system, the IV repeats often over a twenty-four (24) hour period. Exploiting this repetition and the weak IVs makes it very easy to crack WEP.

To counter this problem, a number of solutions have emerged that attempt to fix the problem by developing external fixes to the issues of authentication and security. The typical fix involves a "VPN-like" solution. The solution takes the form of software added to the client-side that encrypts/decrypts data outside of the Wi-Fi card, typically on the user's PC. On the network side of the access point, a server performs the similar function of encryption/decryption. A secure tunnel is formed between the client and the server using the access point only as a conduit between the two ends. Unfortunately, this does not prevent unauthorized users from associating with or using the LAN as the WEP keys can still be easily compromised.

To solve the above problem, others have developed network appliances that force all access points to be directly connected to an appliance box, which is typically a rack-mounted box that performs a specific bunch of functions on the network. For example, an appliance box is a router or an Ethernet switch, or a web-server or virtual private network (VPN) gateway box. Boxes like BlueSocket's WG-1000 Wireless Gateway provide a separate authentication/security server that segregates wireless traffic from the rest of the network. In a sense, a separate LAN is provided, to which all of the access points must connect and then their traffic is directed into their gateway before it is allowed to go onto the LAN.

There are many others that are developing complementary solutions for Wi-Fi networks. Most, however, offer complex solutions geared towards large-scale networks with 200 or more users. These systems are vendor-specific, expensive, complex to install, require ongoing IT support and maintenance, and may not work with legacy Wi-Fi equipment.

SUMMARY OF THE INVENTION

The present invention provides a secure technique of provisioning network cryptographic keys to a client of a wireless network when direct physical transfer is not feasible.

In at least one embodiment of the invention, a secure, remote method of transferring secret information from an intermediary party to a client party is provided in a system featuring tokens possessed by all parties wherein each token is identified by a unique serial number and a unique secret key maintained in a centralized database, a communications interface allowing a client party to be recognized by the intermediary party and exchange secure information, a further communications interface allowing the intermediary party to be recognized and exchange secure information with the centralized database, the method comprising the steps of: generating a secret temporary key by a client token that will later be used to install secret network keys; encrypting the temporary key with a previously installed transport key common to all un-initialized tokens; encrypting the encrypted key with a further secret key known only by a remote database; transferring that double-encrypted key along with an identifying serial number of the client key to an intermediary agent; an intermediary agent acting initially as a proxy for the client further encrypting the client-generated double-cipher with it's own secret key also known only within the same remote database; an intermediary agent transmitting the triple-encrypted cipher along with it's identifying serial number to the remote database program; a remote agent acting upon the triple-encrypted cipher using the received serial number of the intermediary to look up the intermediary's secret key and therefore successfully decrypt the original double-encrypted cipher; the same remote agent using the serial number of the client recovered after the previous decryption to further use the corresponding secret key of the client to decrypt the original cipher resulting in full knowledge of the client's original temporary key; and the same remote agent now re-encrypting the temporary key and returning it to the intermediary agent whereby the intermediary agent with knowledge of the client's temporary key can now encrypt its secret information with the temporary key and successfully transmit the information to the client whereby the client can receive, decrypt and install the secret information in it's client token.

In an embodiment of the invention, a method of distributing at least one enterprise network cryptographic key to a client attempting to access an enterprise network via an edge device of the enterprise network comprises the steps of: receiving first information from a client, encrypting the first information with a predefined enterprise network cryptographic key to generate a first cipher, sending the first cipher and a predefined unique identifier of the edge device of the enterprise network to an authentication server, receiving a second cipher from the authentication server, decrypting the second cipher with a predefined enterprise network cryptographic key to obtain a client cryptographic key, encrypting at least one predefined enterprise network cryptographic key with the client cryptographic key to generate a third cipher, and forwarding the third cipher to the client. The first information comprises a fourth cipher and a predefined unique identifier of the client, the fourth cipher including the client cryptographic key encrypted using a cryptographic key known only to the client and the authentication server. The predefined unique identifier of the client and the edge device are a unique serial number corresponding to an individual token associated with the client and the edge device, respectively. The cryptographic key known only to the client and the authentication server resides in the token associated with the client. The authentication server performs the steps of: identifying a predefined enterprise network cryptographic key associated with the predefined unique identifier of the edge device of the enterprise network, decrypting the first cipher using the identified, predefined enterprise network cryptographic key to obtain the first information, identifying the cryptographic key known only to the client and the authentication server using the predefined unique identifier of the client, decrypting the fourth cipher using the cryptographic key known only to the client and the authentication server to obtain the client cryptographic key, and encrypting the client cryptograph key using a predefined enterprise network cryptographic key to generate the second cipher. The client performs the steps of: generating the client cryptographic key, encrypting the client cryptographic key using the cryptographic key known only to the client and the authentication server to generate the fourth cipher, and decrypting the third cipher using client cryptographic key to obtain the at least one predefined enterprise network cryptographic key. The client cryptographic key is a random number. The edge device is an access point and the enterprise network is a 802.11x network.

In another embodiment of the invention, a method of authenticating a client attempting to access an enterprise network via an edge device of the enterprise network comprises the steps of: receiving information from an edge device of an enterprise network, the information comprising a predefined unique identifier of the edge device of the enterprise network and a first cipher, identifying a predefined enterprise network cryptographic key associated with the predefined unique identifier of the edge device of the enterprise network, decrypting the first cipher using the identified, predefined enterprise network cryptographic key to obtain a second cipher and a unique identifier of the client, determining whether a match exists between the unique identifier of the client and at least one of a number of stored client identifiers, and if a match does exist, identifying a cryptographic key known only to the client and the authentication server corresponding to the unique identifier of the client, decrypting the second cipher using the cryptographic key known only to the client and the authentication server to obtain a client cryptographic key, encrypting the client cryptographic key using a predefined enterprise network cryptographic key to generate a third cipher, and forwarding the third cipher to the edge device of the enterprise network. The enterprise network performs the steps of: decrypting the third cipher with a predefined enterprise network cryptographic key to obtain the client cryptographic key, encrypting at least one predefined enterprise network cryptographic key with the client cryptographic key to generate a fourth cipher, and forwarding the fourth cipher to the client. The predefined unique identifier of the client is a unique serial number corresponding to a token associated with the client.

In yet another embodiment of the invention, a method of obtaining at least one enterprise network cryptographic key from an edge device of an enterprise network comprises the steps of: generating a temporary cryptographic key, encrypting the temporary cryptographic key using a predefined enterprise network cryptographic key to generate a first cipher, encrypting the first cipher with a predefined client cryptographic key to generate a second cipher, forwarding the second cipher along with a unique identifier to an edge device of an enterprise network, receiving a response from the edge device of the enterprise network, decrypting the response using the temporary cryptographic key to obtain at least one enterprise network cryptographic key. The unique identifier is a unique serial number corresponding to a token.

An advantage of the present invention is that network cryptographic keys can be transferred secretly, wherein only a centralized control program knows of secret cryptographic keys and corresponding serial numbers of all parties in the process. Another advantage is that secure, tamper-resistant tokens are used to generate ciphered text that can only be deciphered by entities possessing the appropriate keys installed in their tokens.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE PREFERRED EMBODIMENTS

Preferred embodiments of the present invention and their advantages may be understood by referring to FIGS. 1-9, wherein like reference numerals refer to like elements, and are described in the context of an IEEE 802.11(x) ("Wi-Fi", wherein "x" denotes any of the various extensions of 802.11 such as "a", "b", or "g") wireless network operating in the public space for wireless subscribers. As would be readily apparent to those skilled in the art, the inventive techniques described herein are well suited for any type of wired and/or wireless communications protocol.

Figure 1:
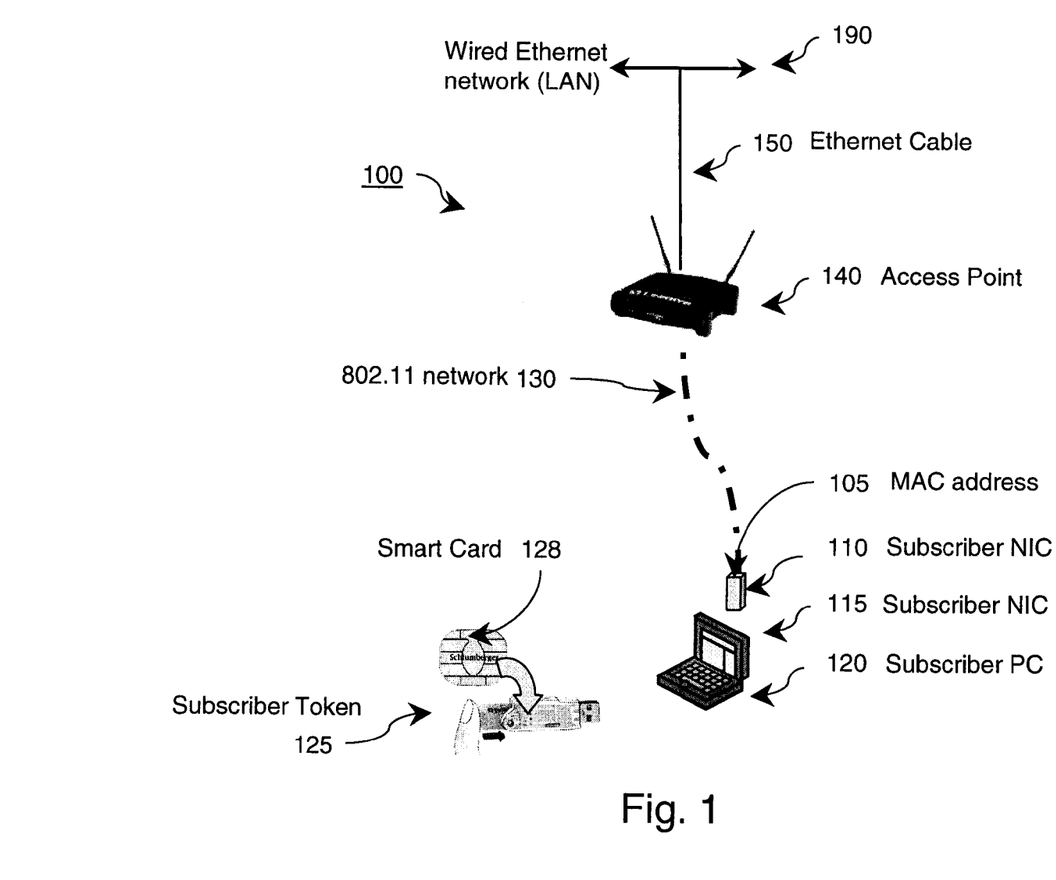
FIG. 1 illustrates an 802.11(x) wireless network service provider system according to an embodiment of the invention.

FIG. 1 illustrates an 802.11(x) wireless network service provider system (100) according to an embodiment of the invention. A subscriber or client of the system (100) employs a computing device (120), such as a laptop, having a wireless network interface card (NIC, 110). The NIC (110) enables communications over an 802.11(x) wireless network (130) between the computing device (120) and a network edge device (140), such as a network access point, which is connected to a wired network (190), such as an Ethernet network, via a wired connection (150), such as an Ethernet cable. The wired network (190) is preferably connected to the Internet, thereby permitting a subscriber access to the Internet. A set of software drivers (115) is provided to interface the NIC (110) to the operating system of the subscriber's computing device (120) and network protocols implemented over the network (130). The NIC (110) is addressed by a Media Access Control (MAC) address (105) or other unique identifier. One of ordinary skill in the art recognizes that the wireless network service provider system (100) can implement more than one network edge device (140), thereby enabling multiple hotspots. Although not shown, the system (100) can facilitate multiple subscribers.

Each subscriber is provided with a physical token (125) ("subscriber or client token") comprising an integrated circuit (128) (or "smart card") or an appropriate cryptographically equipped hardware chip. The subscriber token (125) is preferably configured such that it can be connected to the computing device (120) via a Universal Serial Bus (USB) interface. In alternative embodiments, the subscriber token can take the form of an expansion card, PC card, Personal Computer Memory Card International Association (PCMCIA) cards, serial port hardware, parallel port hardware, or any other hardware configuration that can be coupled to the computing device (120). The subscriber token (125) typically includes a pre-stored set of cryptographic keys that is never exposed to the subscriber or to any network administrator. These pre-stored keys are used to encrypt data that is transferred from the subscriber's computing device (120) to the network edge device (140) preferably in accordance with one or more techniques described in commonly owned and copending U.S. patent application Ser. Nos. 10/679,268, 10/679,371, and 10/679,472, the disclosures of which are incorporated herein by reference in their entirety. Nonetheless, one of ordinary skill in the art recognizes that other secure communications techniques can be implemented in alternative embodiments of the present invention. The smart card (128) can be selected from those available from a wide-variety of manufacturers and preferably is designed and manufactured according to standard International Standards Organization (ISO) specifications, e.g., ISO Specification 7816. In an exemplary embodiment of the invention, the smart card (128) is a Schlumberger Cryptoflex Card. The following disclosure is described in the context of implementing this type of a smart card and its protocol. One of ordinary skill in the art recognizes that the inventive concepts described herein can be modified as needed to suit other types of smart card protocols.

The smart card (128) is a key component of the authentication and secure communications technique(s) described in U.S. patent application Ser. No. 10/679,371. As described therein, the smart card (128) is employed to authenticate the corresponding subscriber to the network edge device (140), which comprises its own smart card facilitated by a corresponding physical token (not shown) ("the network edge device token") coupled to the edge device (140). Each subscriber token (125) and the network edge device token are identified by a uniquely assigned serial number. For example, the serial number can be an eight-byte field that is laser-etched or otherwise permanently inscribed into each token. While the serial number can be freely read, it cannot be changed. Each token can be further provided with a pin number that serves as a password to access and/or unlock the corresponding and underlying smart card during an initiation/installation process.

Figure 2:
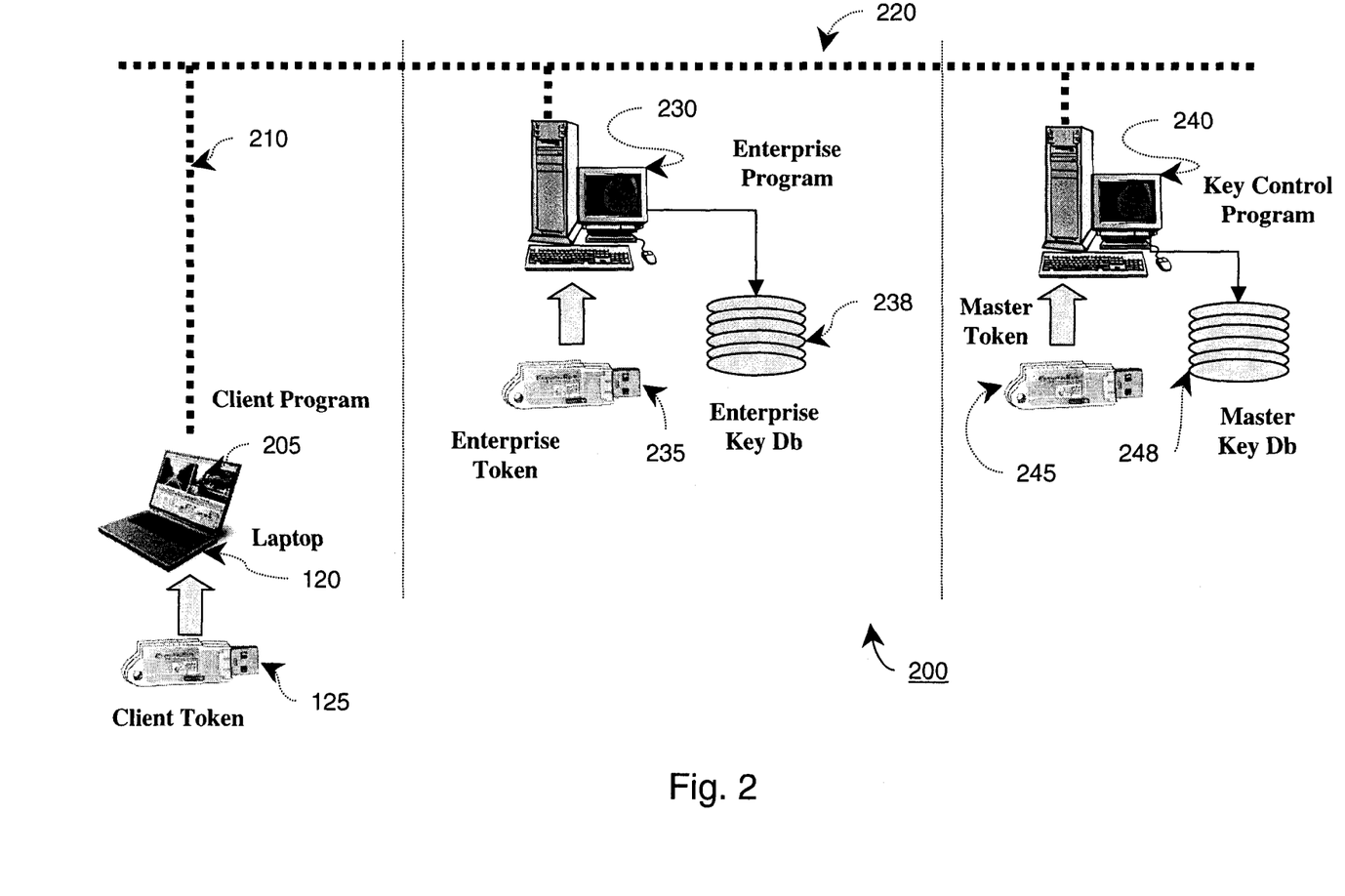
FIG. 2 illustrates an enterprise network according to an embodiment of the invention.

The subscriber smart card (128) and the network edge device smart card can store a set of network cryptographic keys comprising a Network Send Key ($NK_S$), a Network Receive Key ($NK_R$), and a Subscriber Secret Key ($NK_{UIDS}$) (collectively, referred to as "the Network Keys"). The Network Send Key is used to encrypt communications from the subscriber PC (120) to the network edge device (140). The Network Receive Key (230) is used to decrypt communications received by the subscriber PC (120) from the network edge device (140). The Network Send Key (220) and the Network Receive Key (230) are common to all subscribers of the wireless network service provider system (100) or a particular network edge device (140). Generally, the Subscriber Secret Key (240) is uniquely assigned to each subscriber token (125). Moreover, a subscriber smart card (128) may comprise multiple sets of Network Keys corresponding to a number of different wireless network service provider systems and/or network edge devices. For instance, the subscriber may be authorized to access a number of independently operated wireless networks. Although not necessary to understand the present embodiments described herein, one interested in understand the implementation of the Network Keys for secure communication can refer to any one of the disclosures set forth in commonly owned U.S. patent application Ser. Nos. 10/679,268, 10/679,371, and 10/679,472.

Typically, an Information Technology (IT) Administrator or the like would provision the various tokens with the Network Keys using a "Master Token," which is similar in form to subscriber token (125), prior to distribution of the tokens. Appropriate administration software reads the Network Keys in enciphered form from the Master Token and writes them into the subscriber smart card (128) in enciphered form as well. If both the Master Token and subscriber token (125) are physically present and attached to the same secure computer at the location of the administrator, the Network Keys are never exposed or transmitted outside that computer and thus are not susceptible to hackers.

Nonetheless, it is highly desirable to allow a subscriber to become a member of the wireless network service provider system (100) without having the appropriate Network Keys pre-installed into the subscriber smart card (128). For instance, the subscriber token (125) may not be available for transfer of the Network Keys from the Master Token. In the case of ad-hoc use of public wireless networks, it is more convenient for the subscriber to have the Network Keys transferred to the subscriber's token (125) when the subscriber first attempts to gain access to a new wireless network. The present disclosure provides a secure method of provisioning the Network Keys to the subscriber's smart card (128) without having to physically return the subscriber token (125) to the appropriate administrator and/or when direct physical transfer from the Master Token is not feasible.

FIG. 2 illustrates an enterprise network (200) according to an embodiment of the invention. The enterprise network (200) comprises network connections (210/220) to connect a client laptop (120), an enterprise computer (230), and a master computer (240) to one another. The network connections (210/220) may comprise both wired and wireless components and preferably, implements a web-based communications interface or the like, the implementation of which is apparent to one of ordinary skill in the art. For instance, the network connection (210) may be a 802.11(x) wireless connection and the network connection (220) may be a wired connection, wherein an access point (not shown) couples the two connections (210/220) to one another. The client laptop (120), the enterprise computer (230), and the master computer (240) are each associated with a respective client token (125), enterprise or administration token (235), or master token (245). All tokens are initially configured by a Key Control Program operating at the master computer (240), which installs a file structure into each respective smart card within a token. As will be described in greater detail below, the file structure comprises an external key file, an internal key file, and a series of initialized directory files (referred herein as "netadr"), each of which contains both a local external and internal key file. Such a file structure is exemplary only and the implementation of such is apparent to one of ordinary skill in the art. The subscriber token (125) and enterprise token (235) each have a unique serial number associated therewith, which is stored in a master key database (248). Also, each subscriber token (125) and enterprise token (235) is associated with a secret cryptographic key or random number (referred to herein as "K_ID"), which is stored in the master key database (248). No other entity outside the Key Control Program and the respective token know or have access to the token's secret cryptographic key.

The client token (125) via a client program (205), which can facilitate the NIC drivers (115) mentioned earlier, communicates via connections (210/220) with an Enterprise Program operating on the enterprise computer (230). The Enterprise Program recognizes whether or not the client token (125) possesses the appropriate Network Keys for that network (200), which are stored in the enterprise token (235). If the client token (125) does not possess the appropriate Network Keys, then the laptop (120) cannot utilize the enterprise network (200). The embodiments described below assume that the client token (125) does not initially have the Network Keys for this network (200).

In an embodiment of the invention, the Network Keys can be transferred to the client token (125) via the Key Control Program executing on master computer (240). Because the Key Control Program knows the secret cryptographic keys associated with all tokens including the client token (125) and enterprise token (235), the Enterprise Program can communicate via network connection (220) with the Key Control Program to obtain the serial number of the client token (125) from the centralized master key database (248), which is controlled by the master token (245), thereby enabling the Enterprise Program to provision the Network Keys stored within the enterprise key database (238) into the client token (125).

Figure 3:
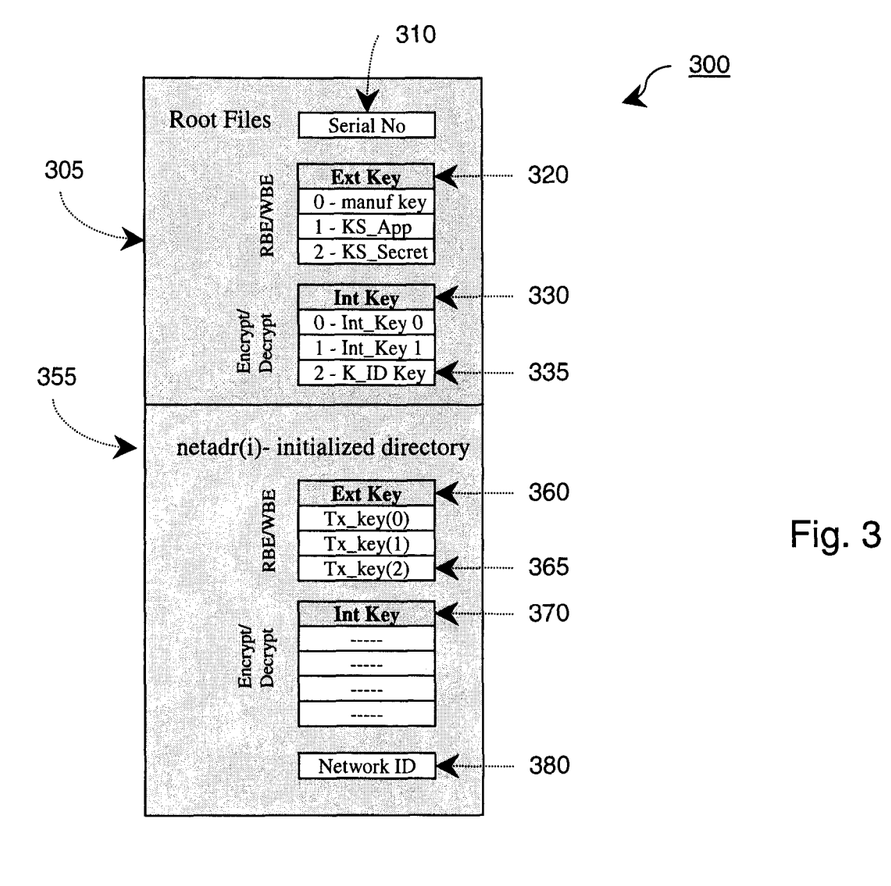
FIG. 3 illustrates a file structure installed into a client token according to an embodiment of the invention.

FIG. 3 illustrates a file structure (300) installed by the Key Control Program into each token according to an exemplary embodiment of the invention. The file structure (300) comprises a root directory (305) and one or more network file directories (355). The root directory (305) comprises a serial number file (310) containing the unique serial number of the corresponding token, an external key file (320), and an internal key file (330). The external key file (320) and internal key file (330) are 'owned' (i.e., managed) by the Key Control Program. In an exemplary embodiment of the invention, up to sixty-four (64) network file directories (355) underneath the root directory (305) can be created. Each network file directory comprises an external key file (360) and an internal key file (370). A given enterprise network, such as the enterprise network 200, takes ownership of, i.e., manages, one of these file directories (355) via the Enterprise Program. Thus, a given client may be an authorized member of up to 64 different enterprise networks. Although the Key Control Program manages and hence has access to the root directory (305), it cannot access an individual network file directory (355). On the other hand, an enterprise network that owns a given network file directory (355) cannot do anything outside of that network file directory.

These external and internal key files may include information pertaining to multiple cryptographic keys as the token can be used for more than one enterprise network. Essentially, the cryptographic keys in an external key file control access to other files on the smart card, whereas the cryptographic keys in an internal key file are used principally for encryption/decryption of data transmitted to and from the token. In an exemplary embodiment of the invention, up to sixteen (16) different cryptographic keys can be provided in each of the external and internal key files.

The internal key file (330) comprises a secret cryptographic key (335) assigned to that token. In an embodiment of the invention, the secret cryptographic key (335) is a Triple Data Encryption Standard (3DES) cryptographic key generated by the smart card itself. One of ordinary skill in the art recognizes that algorithms other than 3DES may be used to generate a secret cryptographic key (335). The secret cryptographic key (335) is stored within a key slot of the internal key file (330). It is important to again note that the master key database (248) stores a copy of the secret cryptographic key (335) of each token along with the corresponding serial number of that token, e.g., serial number (310), and maintains an association among the two. For example, the secret cryptographic key (335) is generated during initialization of the token (125) by the Key Control Program in the presence of the master token (245).

As configured by the Key Control Program, there may be one or more network file directory (355) provided in the token (125) (although only one is shown in FIG. 3). Each network file directory (355) when configured by the Key Control Program comprises an external key file (360), an internal key file (370), and a network identification file (380). The external key file (360) comprises with one or more transport keys (365). Each network file directory (355) will have these transport keys (365) installed in its external key file (360). Each of the three transport keys (365) may be different, but the three keys are generally the same in each of the network file directories (355). The purpose of these transport keys (365) is to provide the enterprise network (200) with a well-known cryptographic key that it can use to first unlock the relevant network file directory that it will own and then replace the well-known transport keys with certain private cryptographic keys that only the network (200) knows. Once the transport keys (365) are replaced by the Enterprise Program with private cryptographic keys, only the Enterprise Program will have access to the files within its network file directory (355).

Each network file directory (355) further includes an internal key file (370) in which the first three slots are initially set to null values. Once an enterprise network takes ownership of a network file directory (355) by replacing the transport keys (365) with its own private keys, three slots of the internal key file (370) will eventually be replaced with the Network Keys ($NK_S$, $NK_R$, and $NK_{UIDS}$) associated with that enterprise network. The network identification file (380) is also initially configured by the Key Control Program to contain all nulls.

When a user of the laptop (120) desires to get network access to the enterprise network (200) for the first time, the previously installed client program (205) will be first directed by the Enterprise Program to a registration web page whereby the user will enter in necessary information to register the user in the enterprise key database (238). Register information may comprise the user's name, address, and billing information. Such web-page redirection and registration is by standard means, the identification and implementation of which is apparent to one of ordinary skill in the art. The client program (205) scans the client token (125) looking for an unused network file directory (355) by reading the contents of the network identification file (380), wherein if the contents are null, it is assumed that this network file directory (355) is unused.

Figure 4:
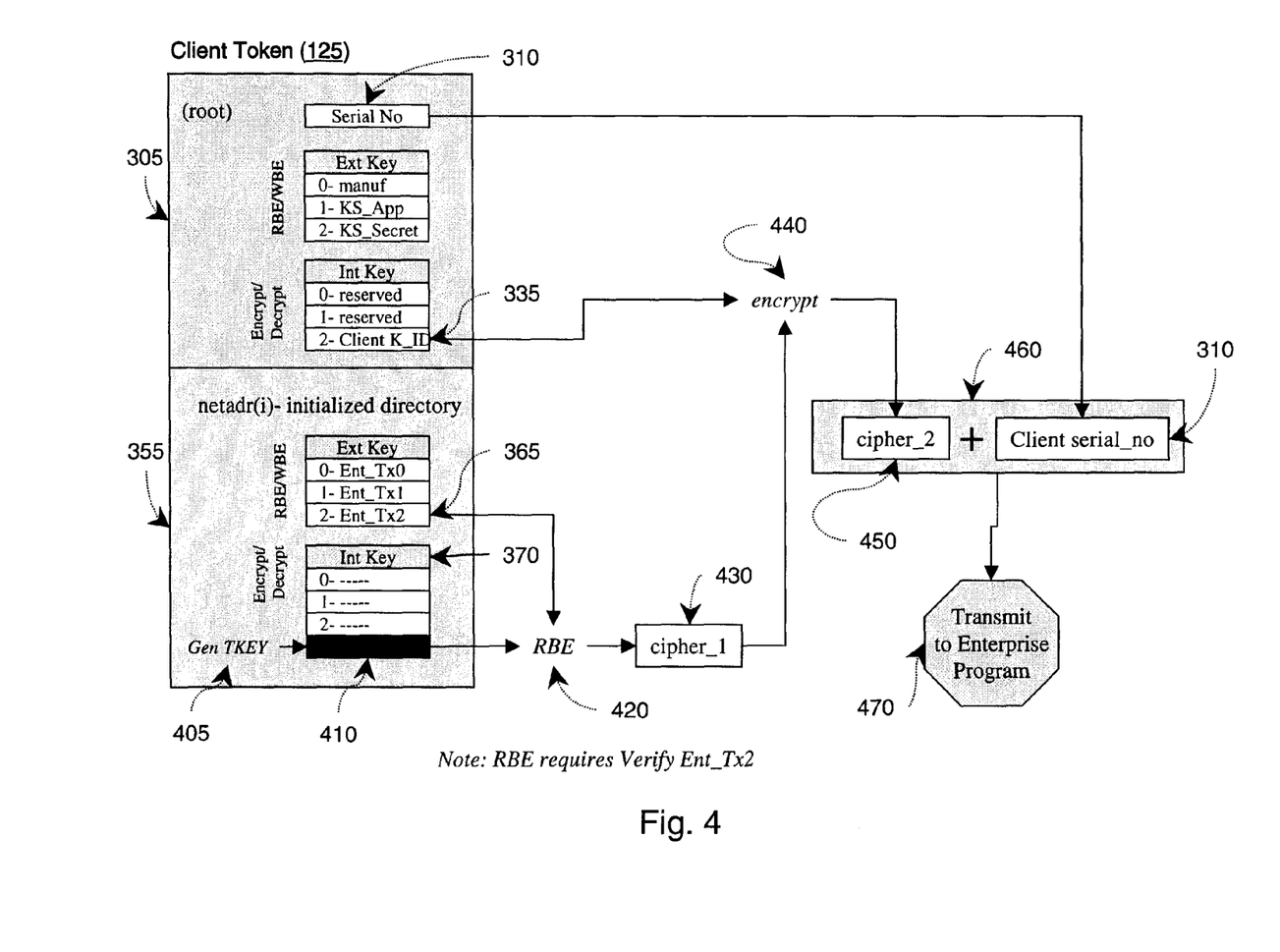
FIGS. 4-9 illustrate a remote secure authentication technique for authenticating a client computer in an enterprise network according to an embodiment of the invention.

According to an embodiment of the invention, FIGS. 4-9 illustrate a remote secure authentication technique for authenticating the client laptop (120) in the enterprise network (200) and provisioning the Network Keys. Referring to FIG. 4, a temporary cryptographic key (410) (referred in the figure as "TKEY") is generated (step 405) in the smart card (128) of the token (125). In an exemplary embodiment of the invention, the temporary key (410) is a 3DES cryptographic key and placed in a slot of the internal key file (370) within the network file directory (355). The internal key file (370) will eventually end up configured with the Network Send Key, $NK_S$, stored in one slot; the Network Receive Key, $NK_R$, stored in another slot, and the Subscriber Secret Key, $NK_{UIDS}$, stored in yet another slot. Thus, the temporary key (410), which will be used as a sort of Trojan Horse to eventually put the right Network Keys for network (200) in the internal key file (370). The client token (125) needs to have these Network Keys transferred into the network file directory (355). However, the network file directory (355) is not protected with the enterprise's external private cryptographic keys yet. So an intermediate player, i.e., the Key Control Program on master computer (240), is used to act as a middleman between the enterprise computer (230) and the client laptop (120).

The temporary key (410), which is essentially a random number, is read in enciphered form using a well known external (transport) key (365). For instance, the temporary key (410) is read from the internal key file (370) through a Read Binary Enciphered (RBE) process (step 420), the implementation of which is apparent to one of ordinary skill in the art, using a transport key (365) from the external key file (360). The resulting enciphered text is shown as cipher (430). The enciphered text (430) is then further encrypted (step 440) using the token's secret cryptographic key (335). The secret cryptographic key (335) is not known by anyone, but the Key Control Program. The resulting double-encrypted ciphertext (450) is then concatenated with the serial number (310) of the client token (125) to form a data packet (460). The data packet (460) is then transmitted (step 470) to the Enterprise Program at enterprise computer (230) using, for example, a HTTP protocol, the implementation of which is apparent to one of ordinary skill in the art. Note there is a one-to-one match between the client's serial number (310) and the secret cryptographic key (335) known only by the Key Control Program.

Figure 5:
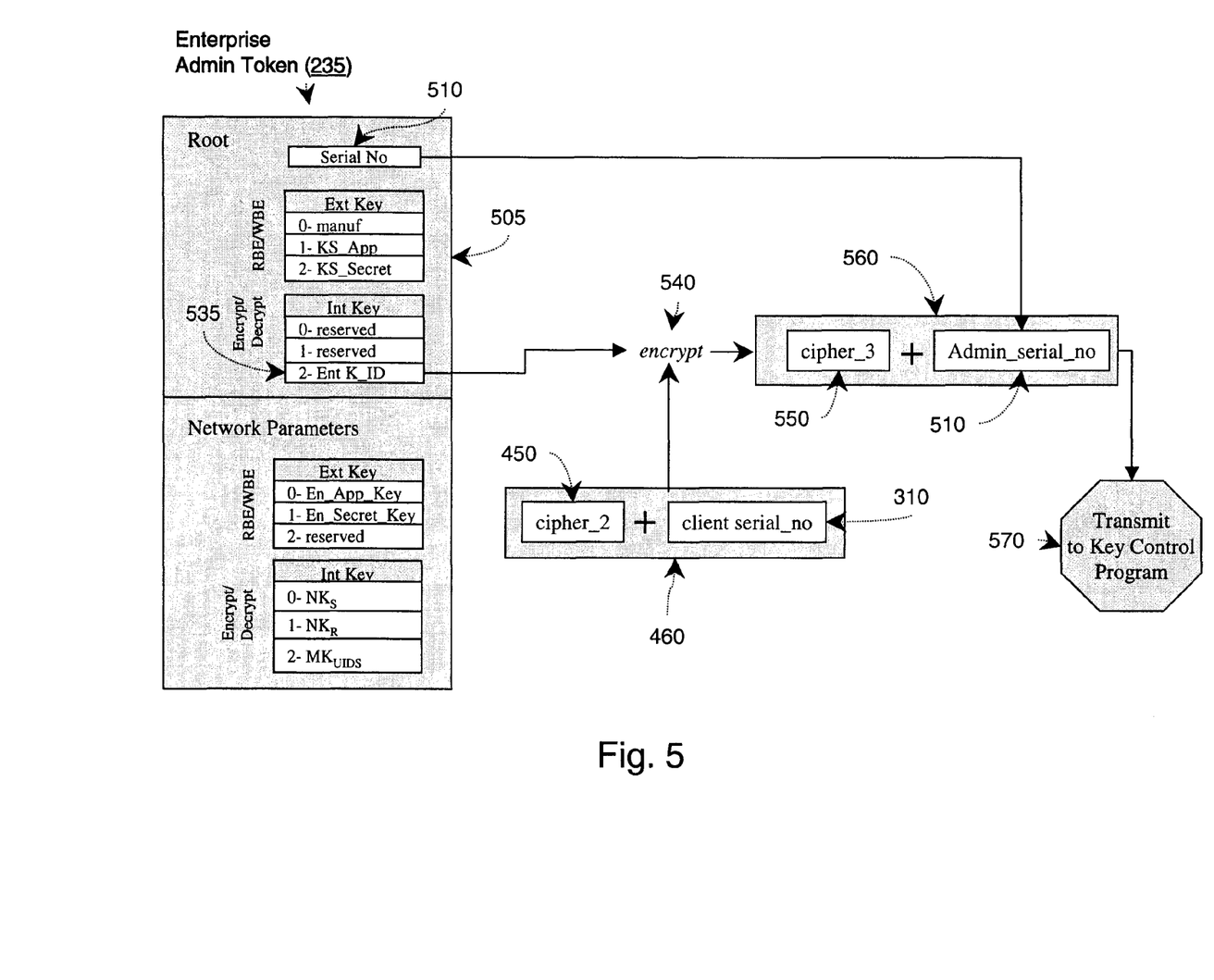

Referring to FIG. 5, on receipt (at the Enterprise Program) of the data packet (460) comprising the encrypted text (450) and the serial number (310) of the client token (125), this entire string (460) is then encrypted (step 540) using the Enterprise's secret cryptographic key (535) taken from the root directory (505) of the enterprise token (235). This results in a third cipher string (550), which is concatenated with the serial number (510) of the enterprise token (235), thereby resulting in a data packet (560). The data packet (560) is then transmitted (step 570) to the Key Control Program using standard communications means, the identification and implementation of which is apparent to one of ordinary skill in the art.

Figure 6:
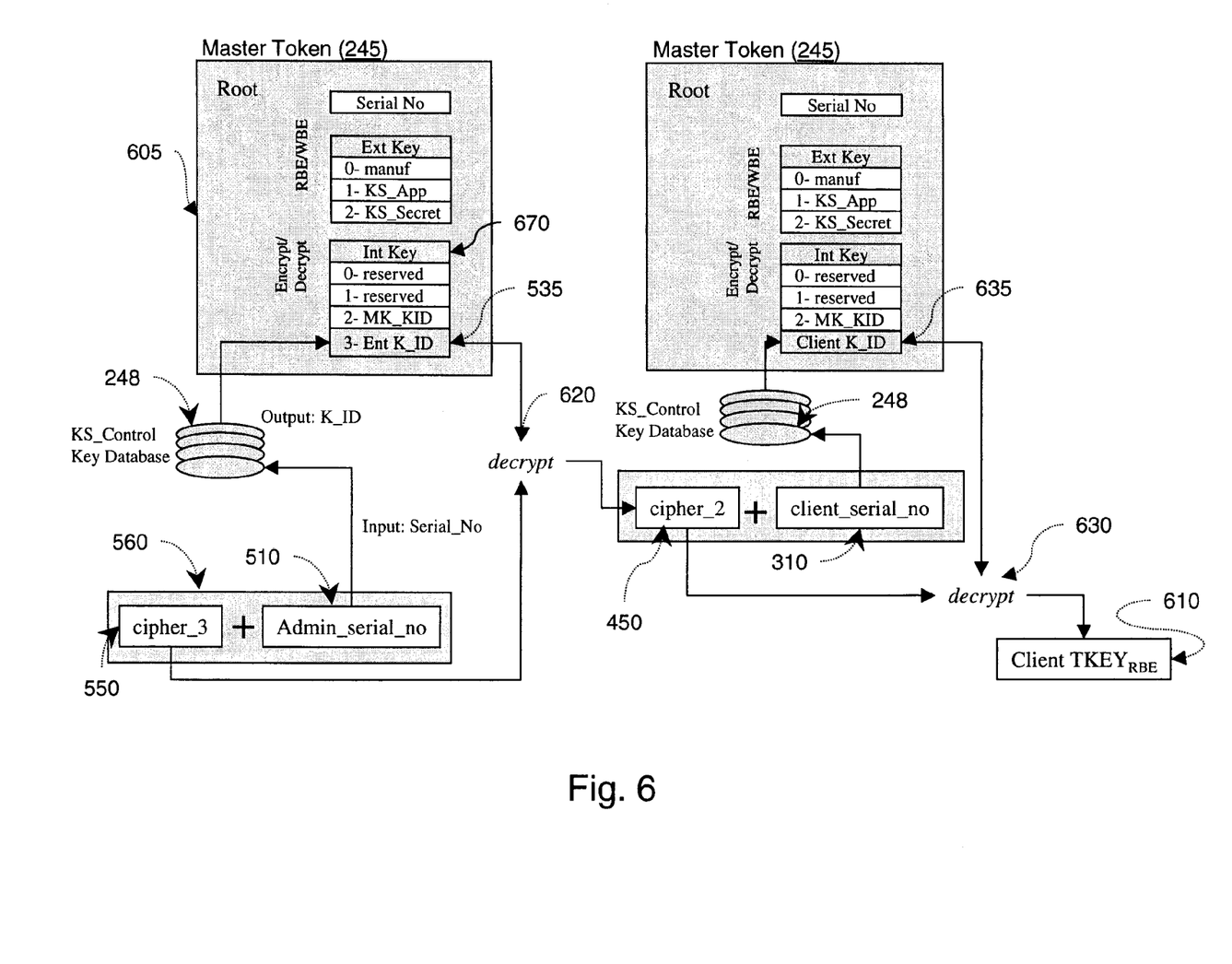

Referring to FIG. 6, on receipt (at the Key Control Program) of the packet (560) comprising the ciphertext (550) and the serial number (510) of the enterprise token (235), the serial number (510) can be used by the Key Control Program to retrieve the Enterprise's secret cryptographic key (535) from the master token database (248). The Enterprise's secret cryptographic key (535) is then written, preferably in encrypted form, into the internal key file (670) in the root directory (605) of the master token (245). As the internal keys of the token are used for encryption/decryption functions, the ciphertext (550) can be decrypted (step 620) by the Enterprise's secret cryptographic key (535) obtained from the master key database (248), thereby yielding the cipher (450) and the original serial number (310) of the client token (125).

Every token configured by the Key Control Program comprises a secret cryptographic key (e.g., 335 or 535) stored inside the internal key file of the root directory in the smart card. This secret cryptographic key is only known by the Key Control Program via the serial number of the respective token. Every token has a unique serial number and, preferably, a unique secret cryptographic key, particularly for all client tokens, all access point tokens, and all enterprise tokens.

The serial number (310) of the client token (125) can now be used by the Key Control Program to retrieve a secret cryptographic key (635) of the client token (125) from the key database (248). If the client token (125) and enterprise token (235) are legitimate tokens, i.e., as issued initially by the Key Control Program, the secret cryptographic key (635) obtained from the key database (248) is identical to the secret cryptographic key (335) stored in the client token (125). If the secret cryptographic key (635) is not the same as the secret cryptographic key (335), for instance if an interloper was attempting to access the enterprise network, but did not send the right serial number, the client laptop (120) would not be able to decrypt the Network Keys in the process described below. In essence, authorization of the client token (125) is a by-product of the provisioning of the Network Keys. In other words, if the client token (125) successfully receives the Network Keys following the steps below, because the serial number (310) was legitimate, the client token (125) is authorized to access the enterprise network.

The secret cryptographic key (635) is then written, preferably in encrypted form, into the internal key file (670) within the root directory (605) of the master token (245). The ciphertext (450) can be decrypted (step 630) using the secret cryptographic key (635), thereby yielding the enciphered temporary key (610). Again, the enciphered temporary key (610) should be identical to the original temporary key (410) sent by the client (120), if the client token (125) and enterprise token (235) are legitimate tokens.

Figure 7:
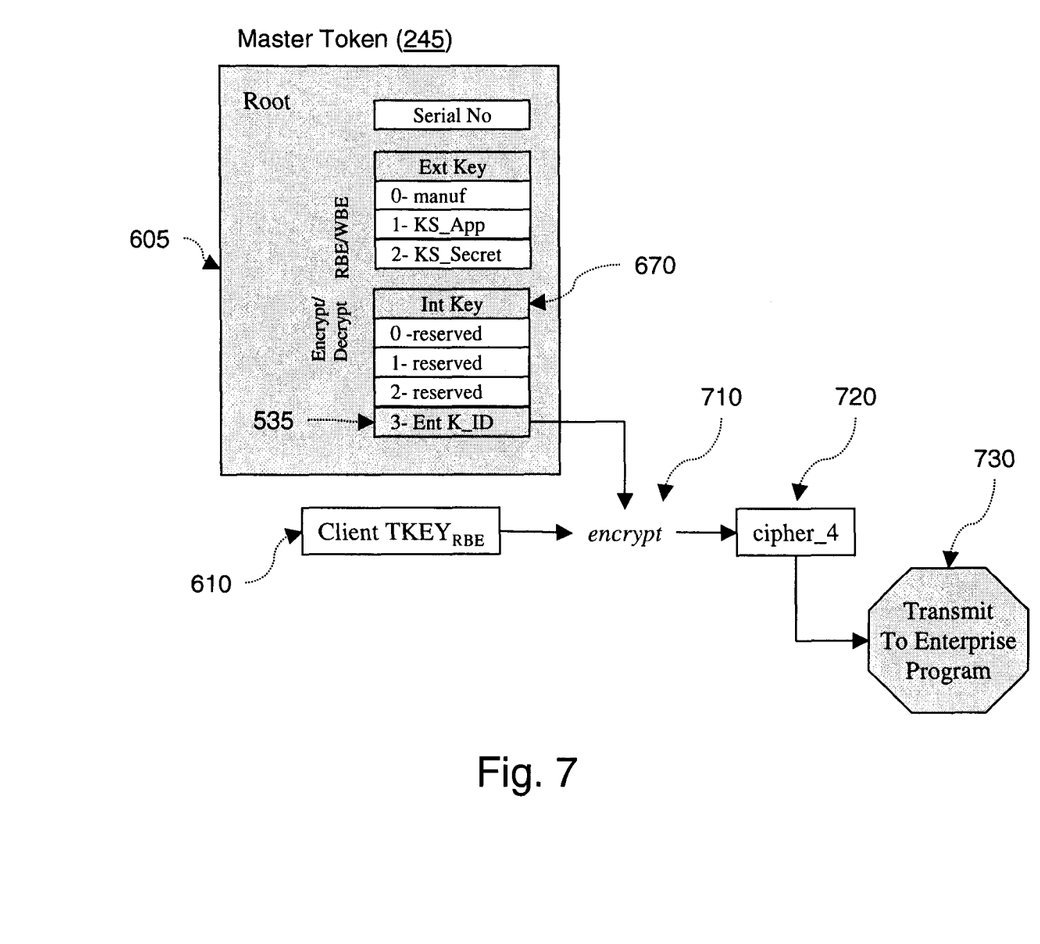

Referring to FIG. 7, the master token (245) can now encrypt the original enciphered temporary key (610) in a similar process to that above by re-installing the Enterprise's secret cryptographic key (535) into the internal key file (670) and encrypting (step 710) the temporary key (610) with the Enterprise's secret cryptographic key (535) of the enterprise token (245), thereby resulting in cipher (720). The cipher (720) is then communicated (step 730) to the Enterprise Program.

Figure 8:
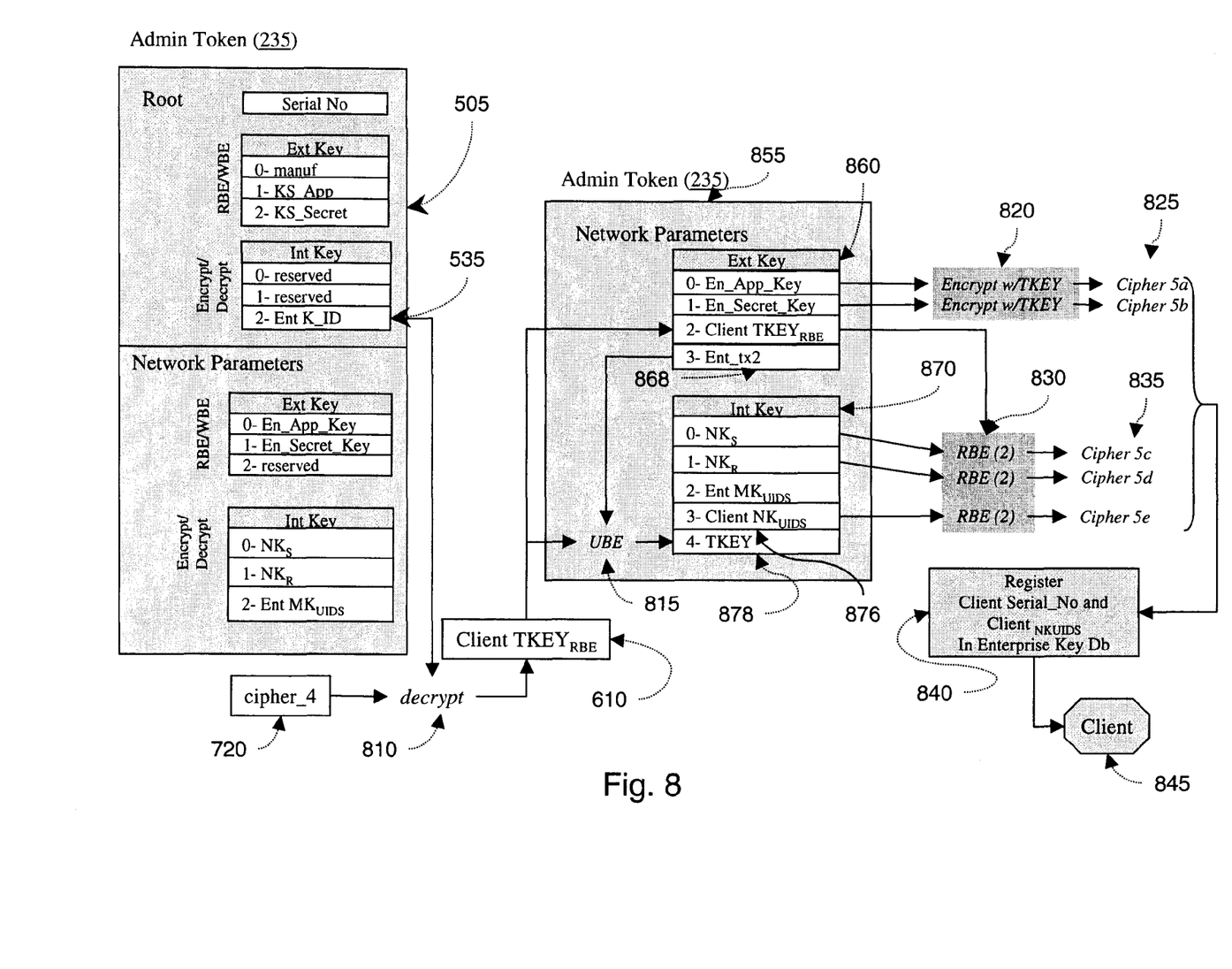

Referring to FIG. 8, the cipher (720) can be readily decrypted (step 810) by the Enterprise's secret cryptographic key (535) permanently stored in the internal key file of the root directory (505) of the enterprise token (235). This allows the enterprise token (235) to securely recover the temporary key (610). As the temporary key (410) was originally read in enciphered form from the client token (125) using the well-known transport key (365) of the relevant network file directory (355), the transport key (365) can be temporarily written into a slot (868) of the external key file (860) stored within network file directory (855) of the enterprise token (235). Now that the transport key (365) exists in the external key file (860), the temporary key (610) can be decrypted, wherein the result is written into a temporary slot (878) of the internal key file (870) of the enterprise token (235). Thus, the enterprise token (235) now contains the identical temporary key (410) of the client token (125).

As an internal key can be used to encrypt/decrypt text, the enterprise keys (in slots marked as #0 and #1) of the external key file (860) can now be read and encrypted (step 820) using the temporary key (410) installed at the slot (878) of the internal key file (870). This results in respective ciphers 5a and 5b (825).

The same temporary key (410) is further written into a slot of the external key file (860). This temporary key (410) is then used to perform a Read Binary Enciphered function (step 830) on the Network Keys (NK$_S$ and NK$_R$ stored respectively in slot #0 and slot #1) within the internal key file (870), as well as a 3DES cryptographic key (876) generated and stored in a slot, thereby resulting in three ciphers, 5c, 5d, and 5e (835). This 3DES cryptographic key (876) is to be subsequently installed in the client token (125) as the client "NK$_{UIDS}$" key, i.e., the subscriber secret key. The client NK$_{UIDS}$ and the client serial number (310) are registered (step 840) in the enterprise key database (238). The ciphers (825 and 835) are then communicated (step 845) to the client program (205).

Figure 9:
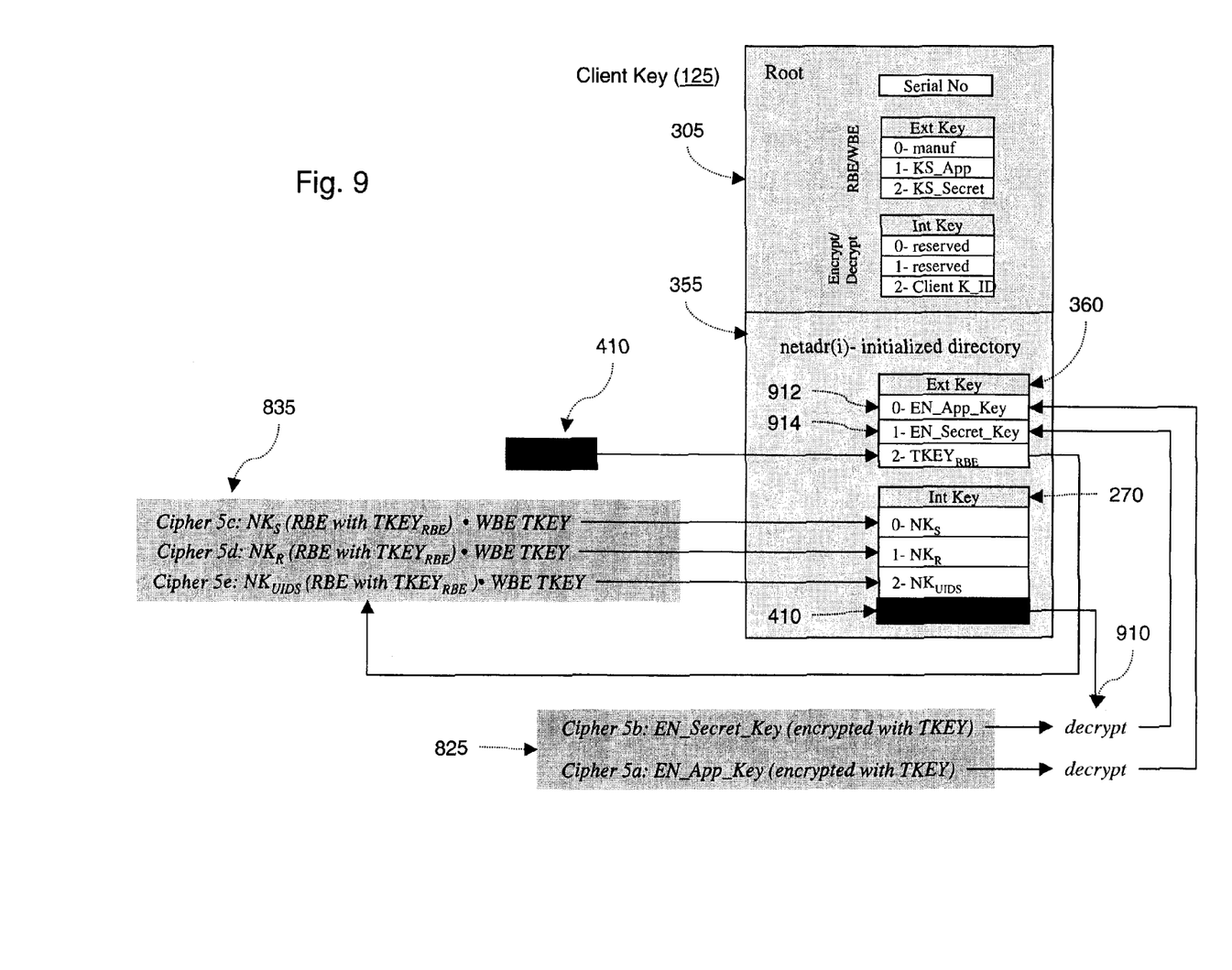

Referring to FIG. 9, the temporary key (410) of the internal key file (370) can be used to decrypt (step 910) both cipher 5a and cipher 5b (825) and installing the results, i.e., the enterprise keys, in slots 0 and 1 of the external key file (360) of the client token (125). The temporary key (410) can be likewise installed in slot #2 of the external key file (360). The temporary key (410) installed the external key file (360) now allows the ciphers 5c, 5d and 5e (835) to be write binary enciphered respectively into slots 0, 1 and 2 of the internal key file (370) of the client key (125), thus completing the transfer of all relevant Network Keys.

It is important to note that the temporary key (410) was extracted using a Read Binary Enciphered function using a well-known Enterprise Transport key (365). While this cipher could have been read by anyone knowing the Enterprise Transport key (365), the cipher was further encrypted by the secret cryptographic key (335) known only by the Key Control Program, NOT by the Enterprise Program. Thus, the temporary key (410) remained safe when received by the Enterprise Program. The Enterprise Program further encrypted the cipher with it's secret cryptographic key (535) known only by the Key Control Program. Since the Key Control Program is the only entity that knows both the secret cryptographic keys (335 and 535), it is the only entity that can recover the original temporary key (410) generated by the client token (125). The Key Control Program can now encrypt the temporary key (410) with the secret cryptographic key (535) known by the Enterprise Program, thus allowing the Enterprise Program the means by which it can successfully transfer it's secret enterprise keys to the client laptop (120). Note further, that the secret enterprise keys were similarly never exposed to the Key Control Program thus preserving confidentiality of everyone's secret information.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

The invention claimed is:

1. A method of obtaining at least one network cryptographic key from an edge device of a network, the method comprising the steps of:
   generating a temporary cryptographic key;
   encrypting said temporary cryptographic key using a network transport cryptographic key to generate a first cipher;
   encrypting said first cipher with a client cryptographic key to generate a second cipher;
   forwarding said second cipher along with a client identifier associated with said client to an edge device of a network, wherein the client cryptographic key is known by an authentication server communicatively connected to the edge device but is not known by the edge device;
   receiving an encrypted response from said edge device of said network; and
   decrypting said response using said temporary cryptographic key to obtain said at least one network cryptographic key.

2. The method of claim 1, wherein said client identifier is a unique serial number corresponding to a token.

* * * * *